United States Patent
Laufer et al.

(10) Patent No.: US 10,883,642 B2
(45) Date of Patent: Jan. 5, 2021

(54) COUPLING SLEEVE FOR A HYDRAULIC COUPLING

(71) Applicant: U.M. GEWERBEIMMOBILIEN GMBH & CO. KG, Werdohl (DE)

(72) Inventors: Klaus Laufer, Meinerzhagen (DE); Artur Firus, Iserlohn (DE)

(73) Assignee: U.M. GEWERBEIMMOBILIEN GMBH & CO. KG, Werdohl (DE)

( * ) Notice: Subject to any disclaimer, the term of this patent is extended or adjusted under 35 U.S.C. 154(b) by 63 days.

(21) Appl. No.: 15/776,976

(22) PCT Filed: Nov. 16, 2016

(86) PCT No.: PCT/EP2016/077865
§ 371 (c)(1),
(2) Date: May 17, 2018

(87) PCT Pub. No.: WO2017/085130
PCT Pub. Date: May 26, 2017

(65) Prior Publication Data
US 2019/0003628 A1    Jan. 3, 2019

(30) Foreign Application Priority Data
Nov. 17, 2015    (DE) .................. 10 2015 222 639

(51) Int. Cl.
*F16L 37/62*     (2006.01)
*F16L 37/00*     (2006.01)
(Continued)

(52) U.S. Cl.
CPC ............. *F16L 37/34* (2013.01); *F16L 37/002* (2013.01); *F16L 37/23* (2013.01); *F16L 37/62* (2013.01); *F16L 2201/20* (2013.01)

(58) Field of Classification Search
CPC ......... F16L 37/34; F16L 37/002; F16L 37/23; F16L 37/62; F16L 2201/20
See application file for complete search history.

(56) References Cited

U.S. PATENT DOCUMENTS 3,380,476 A  *  4/1968  Torres .................... F16L 37/002
                                                  137/614.05
4,447,040 A  *  5/1984  Magorien ............... F16L 37/32
                                                  137/508

(Continued)

FOREIGN PATENT DOCUMENTS

DE     73 01 408 U    9/1973
DE     40 02 226 A1   8/1991
(Continued)

OTHER PUBLICATIONS

International Search Report of PCT/EP2016/077865 dated Jun. 14, 2017 (English Translation).

*Primary Examiner* — David Colon-Morales
(74) *Attorney, Agent, or Firm* — Dickinson Wright PLLC

(57) ABSTRACT

A coupling sleeve (1) for a hydraulic coupling to a pressure medium line, for a coupling with a coupling plug (2), having a housing (3) and a sealing unit (4). The housing (3) has a flow channel (5) for a pressure medium and a coupling axis A. The sealing unit (4) includes a sleeve body (6), a pressure sleeve (7), and a valve tappet (8). The sealing unit (4) delimits part of the flow channel (5), the valve tappet (8) is held on the sleeve body (6) and is arranged in the flow channel (5). The pressure sleeve (7) encloses the valve tappet (8). The pressure sleeve (7) can be displaced along the coupling axis A and is held between a closing position, in which the flow channel (5) is locked, and an opening position, in which the flow channel (5) is unlocked. The pressure sleeve (7) is loaded by a pressure spring (10) in the
(Continued)

closing direction. A coupling force must be applied by a user to produce a positive coupling to a coupling plug (2).

20 Claims, 7 Drawing Sheets

(51) Int. Cl.
   *F16L 37/23* (2006.01)
   *F16L 37/34* (2006.01)

(56) References Cited

U.S. PATENT DOCUMENTS

| | | | |
|---|---|---|---|
| 4,669,791 A | 6/1987 | Savill | |
| 5,123,446 A * | 6/1992 | Haunhorst | F16L 37/23 137/614 |
| 5,873,386 A * | 2/1999 | Arosio | F16L 37/30 137/614.02 |
| 5,884,897 A * | 3/1999 | Arosio | F16L 37/23 137/614.03 |
| 6,026,857 A * | 2/2000 | Stucchi | F16L 37/23 137/614.03 |
| 6,283,151 B1 * | 9/2001 | Countryman | F16L 37/413 137/614 |
| 6,659,130 B2 * | 12/2003 | Arosio | F16L 37/23 137/614.03 |
| 6,814,340 B2 | 11/2004 | Arosio | |
| 6,921,111 B2 | 7/2005 | Dyck et al. | |
| 9,291,293 B2 * | 3/2016 | Prust | F16L 37/34 |
| 9,709,199 B2 * | 7/2017 | Laufer | F16L 29/04 |
| 9,903,520 B2 * | 2/2018 | Gennasio | F16L 29/04 |
| 9,958,101 B2 * | 5/2018 | Gennasio | F16L 37/34 |
| 10,215,319 B2 * | 2/2019 | Gennasio | F16L 37/23 |
| 10,253,912 B2 * | 4/2019 | Danelli | E02F 9/2275 |
| 2004/0251684 A1 | 12/2004 | Dyck et al. | |

FOREIGN PATENT DOCUMENTS

| | | | | |
|---|---|---|---|---|
| DE | 10107907 C1 * | 5/2002 | | F16L 37/23 |
| DE | 10351997 A1 * | 6/2005 | | F16L 37/23 |
| EP | 0 174 210 A2 | 3/1986 | | |
| EP | 1 273 844 B1 | 12/2004 | | |
| EP | 1707863 A1 * | 10/2006 | | F16L 37/34 |
| EP | 2369214 A1 * | 9/2011 | | F16L 37/22 |
| FR | 1 561 337 A | 3/1969 | | |
| FR | 1 577 931 A | 8/1969 | | |
| FR | 1577931 A * | 8/1969 | | F16L 37/23 |

* cited by examiner

COUPLING SLEEVE FOR A HYDRAULIC COUPLING

CROSS-REFERENCE TO RELATED APPLICATIONS

This application is a 35 U.S.C. § 371 national phase application of PCT International Application No. PCT/EP2016/077865, filed Nov. 16, 2016, which claims the benefit of priority under 35 U.S.C. § 119 to German Patent Application No. 10 2015 222 639.5, filed Nov. 17, 2015, the contents of which are incorporated herein by reference in their entirety.

FIELD OF THE INVENTION

The invention relates to a coupling sleeve for a hydraulic coupling of a pressure medium line to produce a form-fit coupling with a coupling plug.

Hydraulic couplings, namely a combination of a coupling sleeve and a coupling plug, serve to connect two sections of a pressure medium line and are used especially to connect hydraulic devices to a hydraulic source, for example, to connect a tool or attachment to agricultural or construction machinery.

So-called flat-sealing coupling sleeves and coupling plugs are known from the prior art, for example, according to ISO 16028 (status: December 1999 with amendments of January 2006), which distinguish themselves in that a flat and closed surface is formed by the components of the coupling plug or the coupling sleeve in the interface area in the disconnected, decoupled, state. This flat surface can be easily cleaned before coupling, which prevents the penetration of dirt into the housing and between the components. Furthermore, in contrast to couplings with a conical valve, for example according to ISO 7241 (status: Jul. 15, 2014), these couplings have only minimal pressure medium (oil) loss during the decoupling procedure. Such flat-sealing hydraulic couplings are particularly suitable for use in environments in which a pressure-medium spill is problematic.

A differentiation is furthermore made between those hydraulic couplings that are decoupled by actuating an external sliding coupling and those that decouple automatically when a predetermined relative force between the coupling plug and the coupling sleeve is exceeded and at the same time connect the flow channels to the coupling sleeve or the coupling plug. A loss of pressure medium is prevented in this way.

From EP 1 273 844 B1 is known, for example, a flat-sealing hydraulic coupling with a coupling plug and a coupling sleeve in which a decoupling, that is, a separation of the coupling plug and the coupling sleeve, takes place in that a relative force is applied between the coupling plug and the coupling sleeve.

The coupling of a hydraulic coupling, that is the creation of a form-fit coupling between a coupling sleeve and a coupling plug, is usually carried out in that the coupling plug is inserted by a user into the coupling sleeve, whereby at least one valve is likewise respectively opened as a result of the force applied by the user to fluidically connect a pressure medium line at the coupling plug with a pressure medium line at the coupling sleeve as well as create a form-fit coupling between the coupling plug and the coupling sleeve in order to stabilize the connection or the coupled state.

The hydraulic couplings known from the prior art have the disadvantage, however, that a user cannot detect whether or what pressure there is, for example, on the coupling plug or the coupling sleeve when a tool is to be connected to a hydraulic source, which results in a safety risk for the user.

SUMMARY AND INTRODUCTORY DESCRIPTION OF THE INVENTION

The person skilled in the art is therefore faced with the object of disclosing a coupling sleeve, especially one for a hydraulic coupling, which is improved with respect to safety and ease of operation.

The aforementioned object is attained with a generic coupling sleeve for a hydraulic coupling having the features of the tag part described herein, namely in that the size of the surfaces, particularly the surfaces of the pressure sleeve from which a direct or indirect force in the direction of the closing position results on the pressure sleeve, at least in the closing position of the pressure sleeve with a pressure p of a pressure medium present in the flow channel, is selected in such a way that at a predetermined upper pressure value of the pressure p a predetermined first threshold value of the coupling force of the coupling sleeve is exceeded in order to prevent a user from bringing about a positive coupling by use of a coupling plug.

The coupling sleeve includes a preferably cylindrical housing, in which the components of the coupling sleeve are arranged. The housing delimits at least in part a flow channel for a pressure medium and extends preferably rotationally symmetrically around a longitudinally running coupling axis. The housing has a connection, in particular a screw connection, at a first end for connecting the flow channel to a pressure medium line. On the housing, along the coupling axis, opposite to the screw connection, namely on the second end of the housing, the coupling sleeve is provided with an advantageously flat-sealing configuration, so that the housing forms a flat surface with the internal components in the decoupled state. This surface is the interface with the coupling plug.

A sealing unit, which preferably has all movable components of the coupling sleeve inside the coupling, is arranged inside the housing. For example, the sealing unit is inserted into the housing via the housing opening at the second end of the housing and is held within the housing by use of a locking sleeve. The pressure sleeve can preferably be moved between a first position, in the decoupled state; and a second position, in the coupled state, into the housing. The locking sleeve is fixedly connected at the end to the housing, for example, screwed to the housing. The locking sleeve is screwed, for example via a thread configured over its circumference, with a corresponding thread configured on the inner circumference of the housing, wherein at least one seal, particularly at least one O-ring, is additionally arranged between the locking sleeve and the housing.

The sealing unit includes a sleeve body, a pressure sleeve, and a valve tappet. The sealing unit delimits a part of the flow channel within the housing, wherein the flow channel is delimited at least in part by the sleeve body of the sealing unit. The sleeve body preferably has over its outer circumference at least two sealing areas, each with respectively at least one seal, which sealingly abut against a corresponding inner circumference of the housing. The sealing areas are preferably provided on different diameters of the sleeve body.

The valve tappet is held on the sleeve body by use of a tappet guide in such a way that the valve tappet is preferably arranged in the center, within the flow channel, whereby the valve tappet is enclosed all around by the flow channel. The tappet guide preferably has a plurality of recesses, through which the pressure medium can flow, and which thus constitute a part of the flow channel. The valve tappet is preferably screwed or clamped to the tappet guide.

The pressure sleeve of the sealing unit is arranged in such a way that it encloses the valve tappet. The pressure sleeve can furthermore be displaceably held along the coupling axis between a closing position, in which the flow channel is closed off by the pressure sleeve, and an opening position, in which the pressure sleeve opens the flow channel. The pressure sleeve is constructed as a hollow cylinder and preferably has different wall thicknesses along its longitudinal extension. It is thus provided, for example, that the wall thickness is greatest in the area of a first face pointed in the direction of the opening position. It is furthermore also provided that the wall thickness decreases, in particular gradually, starting from the wall thickness in the area of the first face toward the second face, which is oriented in the direction of the closing position. The wall thickness of the pressure sleeve is smallest, particularly in the area of the second face.

The pressure sleeve preferably encloses the valve tappet in such a way that the second face of the pressure sleeve, which faces in the direction of the closing position, is coplanar with the external face of the valve tappet. The second face is then part of the flat-sealing surface at the second end of the housing together with the external face of the valve tappet in the uncoupled state of the coupling sleeve. A sealing between an outer circumference of the valve tappet, which is preferably widened compared to the shaft of the valve tappet, the valve tappet head, and an inner surface of the pressure sleeve, takes place in the closing position of the pressure sleeve. At least one circumferential seal is arranged between the valve tappet and the pressure sleeve, particularly between the inner circumference of the pressure sleeve and the outer circumference of the valve tappet.

Alternatively, it is provided that the pressure sleeve abuts at least indirectly against the valve tappet, especially against the valve tappet head, in its closing position so that a force parallel to the coupling axis is produced on the valve tappet by the pressure sleeve. In this case, the second face is not part of the external face. A sealing takes place between a preferably conical surface of the valve tappet head and a preferably conical surface of the pressure sleeve in the closing position. A seal, which abuts against an inner circumference of the pressure sleeve in the closing position of the pressure sleeve, is additionally provided on the valve tappet head.

The pressure sleeve can be moved from the closing position against the force of a pressure spring in the direction of an opening position, whereby the flow channel between the pressure sleeve and the valve tappet is opened by the pressure sleeve. The pressure sleeve is preferably indirectly or directly displaced into its unlocking position by use of the force applied by a user via a coupling plug.

A coupling plug is attached by its basic plug body by a user to the coupling sleeve, in particular to the flat-sealing face at the second end of the housing, in order to produce a form-fit coupling between a coupling plug and a coupling sleeve and thus connect and couple the flow channels and the coupling plug, the coupling plug being inserted at least in part into the housing of the coupling sleeve, so that the valve tappet of the coupling sleeve initially exerts a force on the spring loaded tappet of the coupling plug, whereby the plug of the coupling plug is moved in the direction of its unlocking position. The basic plug body simultaneously exerts a force directly or indirectly parallel to the coupling axis on the pressure sleeve, so that the pressure sleeve is displaced by the force of the user in the direction of its unlocking position.

The coupling plug has an external circumferential groove in its basic plug body, into which locking elements can move, in particular, retaining balls, provided radially in the sealing unit in a predetermined position. The predetermined position is reached when the circumferential groove of the basic plug body is inserted so far into the housing of the coupling sleeve that the circumferential groove is arranged flush with the locking elements.

As soon as the locking elements can move into the circumferential groove of the coupling plug, a movement of the sealing unit, provided it can be moved, which abuts against the locking sleeve in decoupled state in its first position is unlocked, so that the entire sealing unit moves in the direction of the housing interior, in the second position of the sealing unit, whereby the locking elements are fixed by use of a locking surface of the locking sleeve in the circumferential groove of the coupling plug, and a form-fit coupling between the coupling plug and the coupling sleeve is produced. The pressure sleeve is held thereby at the same time in its opening position, so that the flow channel of the coupling plug is fluidically connected to the flow channel of the coupling sleeve.

A coupling force must be applied by a user during a manual coupling in order to produce a form-fit coupling which in the coupling sleeve consists at a pressure p in the flow channel, for example, of the spring force of the pressure spring acting on the pressure sleeve, the pressure forces exerted in the direction of the closing position of the pressure sleeve that result from the pressure p acting on the relevant surfaces of the pressure sleeve as well as the pressure-dependent frictional forces of the components in the housing of the coupling sleeve. The coupling force of the coupling plug is a result of the spring force of the spring of the spring-loaded tappet and the frictional forces.

The coupling force of the coupling plug and the coupling sleeve can be determined according to the present invention, for example with a process in which a coupling plug and a coupling sleeve are mechanically moved toward each other in a measurement setup, and the coupling force required for joining the force sensors, especially a strain gauge or a force transducer with piezoelectric element, is determined.

The coupling sleeve and the coupling plug are filled with hydraulic oil and sealed for this purpose. Suitable as hydraulic oil is, for example, mineral hydraulic oil of the type HLP according to DIN 51524, Part 2, (status: April 2006) of the viscosity class ISO VG 46 according to DIN ISO 3448 (status: February 2010). The pressure within the coupling plug corresponds to the ambient pressure, while the pressure in the coupling sleeve is adapted for each measurement according to the threshold value for the pressure and is, for example, between 0 MPa and 2 MPa. To measure the coupling force, the coupling plug and the coupling sleeve are arranged opposite each other in the measurement setup and the coupling plug is moved toward the coupling sleeve at a speed of 40 mm per minute until a coupling is produced. A universal traction-pressure testing machine (type 112.20N from the manufacturer Test GmbH) is used for this purpose. The force transducers of the testing machine use strain gauges for determining the force. The measured maximum force required for the coupling procedure corresponds to the coupling force of the coupling plug and the coupling sleeve. The coupling force of the coupling plug, which can usually be estimated at 70 N to 140 N, must be deducted to calculate the coupling force of the coupling sleeve.

It is provided according to the invention that the size of the surfaces, especially of the pressure sleeve, from which a force in the direction of the closing position of the pressure sleeve results if a pressure p is present in the flow channel, is selected in such a way that, with a predetermined upper pressure value of the pressure p, a predetermined first threshold value for the coupling force of the coupling sleeve is exceeded, so that a user is prevented from manually producing a positive coupling to the coupling plug. The boundary conditions apply, according to the invention, at the usual operating pressures of hydraulic couplings, namely at pressures of up to 42 MPa, especially between 25 MPa and 42 MPa. The coupling sleeve according to the invention preferably has a nominal width of 19, 16, or 12.5 mm.

If the recipient, for example, a tool or an attachment, connected to a machinery via a hydraulic coupling with a coupling sleeve is operated via a load sensing system of the machine, then the volume flow delivered by the pump is regulated via the pressure to be applied on the recipient. To operate such a system, at least one measuring line, which transmits the pressure signal from the recipient to the machinery, a pressure line via which the recipient is provided with fluid under pressure, and a tank line via which the fluid is again conveyed back into the tank of the machinery, must be arranged between the machinery and the recipient. When the machinery is activated, a pump with 20 MPa to 25 MPa operating pressure delivers a pressure of approx. 2 MPa at the coupling sleeve. This pressure is also to be applied if no hydraulic power is consumed by the recipient. If the pressure line was coupled at 2 MPa, the recipient, for example, a tool, could under certain conditions perform movements that are not desired, on the one hand, and put the user at risk, on the other hand. It is therefore practical to configure the coupling sleeve in such a way that a manual coupling at a pressure of 2 MPa within the flow line is not possible. It is therefore advantageously provided that the upper pressure value is lower or equal to 2 MPa, especially preferably lower than 1.5 MPa, especially lower than 1 MPa.

In particular, according to the invention, only those surfaces or surface portions from which an effective force actually results are accounted for during the selection. Such surfaces or surface portions on which the pressure p do indeed act in the direction of the closing position, but for which an equally large surface or surface portion exists on which the pressure p likewise acts and from which a force in the direction of the opening position of the pressure sleeve likewise results, are not taken into account, since these forces balance each other out. Consequently, only relevant surfaces from which an effective force in the direction of the closing position results are used. The selected size of the surfaces, that is, the selected overall size of all individual surfaces, is consequently determined as the difference between the size of all surfaces from which any force in the direction of the closing position actually results, minus the surfaces from which a force results in opposite direction. The pressure sleeve is consequently configured in such a way that the pressure sleeve has surfaces with the selected size and area, from which originates a force in the direction of the closing position if pressure is applied on the flow channel.

Taken into consideration in construction are the surfaces of the pressure sleeve itself, as well as at least in part the surfaces of the elements present on the pressure sleeve, for example seals, from which likewise a pressure-induced force in the direction of the closing direction toward the pressure sleeve emanates. A force on the pressure sleeve can act in the direction of the closing position, for example, from a seal arranged in a groove in an outer periphery of the pressure sleeve.

The relevant surface from which a force acts on the pressure sleeve in the direction of the closing position is calculated in particular as an annular surface, namely as an annular surface area calculated on the basis of the difference of the circular surface within the inner diameter of the component into which the pressure sleeve is guided in longitudinal direction and against which a seal arranged on the pressure sleeve abuts, that is, the sealing diameter on which the component that guides the pressure sleeve as well as the circular surface within the inner diameter of the pressure sleeve in the area of the valve tappet, that is, the sealing diameter in the area of the valve tappet body, especially the inner diameter at the end area of the pressure sleeve that faces in the direction of the closing position.

The inner diameter of the component into which the pressure sleeve is guided is therefore taken into consideration in the calculation, because the surface of the seal to be considered, which is arranged between the pressure sleeve and the component that guides the pressure sleeve, and from which a force on the pressure sleeve results in the direction of the closing position, is then likewise taken into consideration. If the area size of the annular surface, that is the surfaces from which a force originates, are calculated in this way, the surfaces on which the pressure acts, but from which no force results in the direction of the closing position, are automatically not considered.

The area size of the relevant surfaces of the pressure sleeve and the elements arranged on the pressure sleeve, especially a seal, is selected in such a way according to the invention that the coupling force of the coupling sleeve with an upper pressure value is at least great enough, therefore exceeding a threshold value that a manual coupling of a coupling plug is reliably prevented. The diameter and/or the wall thickness of the pressure sleeve, for example, can be varied for this purpose. The forces acting on the relevant surfaces of the pressure sleeve and the seal define a significant proportion of the coupling force of the coupling sleeve to be applied, this proportion being further increased by the specific pressurization of the pressure sleeve through the selection and determination of the size of the surfaces.

The first threshold value for the coupling force usually amounts to about 900 N, preferably at least 1000 N, particularly preferably at least 1200 N. By use of this selection of the size of the surface areas of the pressure sleeve with a seal arranged thereon, it is ensured that a coupling procedure, starting at a specific pressure value, is no longer possible and thus an opening of the flow channel cannot take place. The safety of a user is increased thereby.

A coupling of a coupling plug, that is, the production of a positive coupling, can only then take place again if the pressure in the flow channel has been reduced to such an extent, for example, by turning off the pump, that the pressure value falls below the first threshold value.

The selection of the upper pressure value and the first threshold value for the coupling force of the coupling sleeve is always carried out taking likewise into consideration the factors that influence the coupling force, namely the spring and frictional forces that also influence the coupling force. A final and thus pressure-dependent control of the coupling force is however carried out by use of the constructive selection of the size of the surfaces pressurized with the pressure p, which exert a force on the pressure sleeve in the direction of its closing position. Thus, according to the invention, an intentional pressurization of the pressure sleeve thus takes place, so that the force in the direction of the closing position is increased.

A separation of the coupling sleeve and the coupling plug takes place in such a way that a relative force, for example, a tractive force, is applied between the coupling plug and the coupling sleeve, which causes the sealing unit to move within the housing of the coupling sleeve from its second position, in which the positive coupling to the coupling plug is ensured, into its first position. In the first position of the sealing unit, the locking elements can again extensively move into the inner groove, preferably into the locking sleeve, whereby the sealing unit is held in a positive manner in its first position, unlocking position, by use of the locking elements.

During such a separation procedure, a closing of the flow channels takes place automatically in that the pressure sleeve is moved, among other things, by the pressure spring from its opening position into its closing position. During the course of the movement of the sealing unit in the direction of the first position or the coupling plug out of the coupling sleeve, the spring-loaded tappet of the coupling plug is moved at the same time into its closing position, so that the coupling plug as well as also the coupling sleeve are sealed off after the full separation procedure is completed.

Because experience has shown that the pressure in the line section between the pump and the coupling sleeve drops fully only after a specific time, it is further provided that coupling is possible at low applied pressures on the sleeve side. It is provided for this purpose in a first embodiment that the size of the surfaces, especially those of the pressure sleeve and the arranged seal, from which at least indirectly pressure results on the pressure sleeve in the direction of the closing position when there is a pressure p present in the flow channel, are selected such that below a predetermined lower pressure value of the pressure p, a predetermined second threshold value for the coupling force of the coupling sleeve will be underrun.

Through the constructive configuration, the selection of the surfaces from which a force on the pressure sleeve results, at least indirectly, in the direction of the closing position such that a threshold value for the force is exceeded at an upper pressure value, and at the same time, starting from a lower value, a threshold value for coupling force is not met, it is ensured that, on the one hand, a coupling is reliably prevented at an excessively high pressure, which would result in a safety risk for a user, and at the same time it is however ensured that a coupling of a coupling plug in the coupling sleeve is possible in a user-friendly and easy manner with a lower pressure value. The influencing variable to ensure these limiting conditions is thereby always the size of the surfaces, that is, the sum of all relevant single surfaces from which a force on the pressure sleeve results in the direction of its closing position.

The lower pressure value is preferably 0.5 MPa, preferably 0.3 MPa, particularly preferably 0.25 MPa. The second threshold value for the coupling force is, for example, 450 N, but in particular 350 N, particularly preferably 300 N.

It also applies here that the spring forces of the springs provided in the coupling sleeve as well as the pressure-dependent frictional forces within the movable components of the coupling sleeve must be taken into consideration in a constructive selection of the surfaces. The decisive use for the constructive adjustment of the coupling force is however here also the selection of the size and the corresponding constructive configuration of the surfaces of the pressure sleeve with the seal arranged thereon, from which a force in the direction of the closing position of the pressure sleeve results with an applied pressure.

The advantage of this exemplary embodiment is that a coupling is very comfortably possible and ensured until the lower threshold value is reached, and that a manual coupling is reliably prevented when the upper pressure value is reached.

It has been shown to be particularly advantageous according to another embodiment if it is provided that the coupling force of the coupling sleeve with an upper pressure value of 1 MPa is at least 800 N, preferably at least 1000 N, particularly preferably at least 1200 N. Through a corresponding selection of the surfaces, especially of the pressure sleeve, it is ensured in this exemplary embodiment that a coupling force of at least 800 N, especially 1000 N, preferably 1200 N, is reached with a pressure p of 1 MPa applied in the flow channel. With a coupling force of 1200 N, it is also not possible even for a very strong person to connect the coupling plug in such a way to the coupling sleeve that the flow channel is opened. A connection of a coupling sleeve to a coupling plug is consequently impossible with such a pressure, and it is ensured in this way that the surfaces, especially of the pressure sleeve, are selected in such a way that the pressure p over the constructively selected surfaces exerts a particularly great force on the pressure sleeve in the direction of the closing position.

A comfortable handling of the coupling sleeve is ensured in that it is provided according to another exemplary embodiment that the coupling force with a lower pressure value of 0.5 MPa is at most 450 N. If, as a consequence, a pressure p of 0.5 MPa is applied in the flow channel of the coupling sleeve, it is ensured by use of the selection of the surfaces that the coupling force is at most 450 N. It is preferably at most 350 N with a pressure p of less than 0.3 MPa, preferably at most 300 N with a pressure p of less than 0.25 MPa. Experience shows that starting at 350 N in particular, a hydraulic coupling can be readily accomplished by hand by a user.

To further improve the coupling sleeve, it is provided according to a further embodiment that the sealing unit includes a sleeve inner body, and that the pressure sleeve is guided by the sleeve inner body. The pressure sleeve is preferably guided within the sleeve inner body. The sleeve inner body is preferably mounted on the sleeve body. The pressure sleeve advantageously has a groove in its outer circumference in the direction of the sleeve inner body, wherein a seal, especially an O-ring, is arranged in the groove. An annular gap, toward which the pressure sleeve is guided, and which is filled by the seal, is available between the outer circumference of the pressure sleeve and the inner circumference of the sleeve inner body. An existing pressure acts on the surface of the annular gap, especially on the seal in this area, whereby a force is produced, indirectly, on the pressure sleeve in the direction of the closing position. The surface of the annular gap is consequently a relevant surface for the coupling force of the coupling sleeve, which is taken into account in the design according to the invention. The calculation is consequently carried out using the sealing diameter in the area of the sleeve inner body.

The force transmission between the pressure sleeve and the sleeve inner body can be improved according to another embodiment in that it is provided that the pressure sleeve has a first projection, and the sleeve inner body has a second projection, and in that with the first projection and the second projection, a force can be transmitted from the pressure sleeve to the sleeve inner body, especially a force acting in the direction of the closing position of the pressure sleeve. The first projection and the second projection are preferably configured as circumferential, so that a uniform force transmission can take place. The advantage of this exemplary embodiment consists of the force emanating from the pressure sleeve being introduced into the sleeve body via the sleeve inner body. The valve tappet is therefore not loaded with additional, in particular pressure-dependent forces in axial direction, that is, along the coupling axis. This is therefore advantageous since the pressure sleeve is specifically pressurized with pressure-dependent forces according to the invention.

For example, the first projection and the second projection in the unloaded closed state and in the closed state with pressures of under 2 MPa are spaced from each other in a direction parallel to the coupling axis. The length of the pressure sleeve is configured for this purpose in such a way that the pressure sleeve abuts against the valve tappet, in particular against the valve tappet head, and the first projection and the second projection are mutually spaced from each other at the same time. The valve tappet is elongated as a result of the pressure-dependent forces, and the pressure sleeve is expanded, starting at a predetermined pressure, whereby the first projection and the second projection come into contact, only at a predetermined operating state of the coupling sleeve. A force transmission between the first projection and the second projection parallel to the coupling axis takes place, in particular, only starting at pressures within the flow channel of more than 15 MPa, advantageously more than 25 MPa, preferably more than 35 MPa. The usual operating pressure of the coupling sleeve is between 25 MPa and 40 MPa, especially 35 MPa; it is preferably provided that the first projection and the second projection come in contact starting at a pressure within the range between 1.5 times and 2 times the intended operating pressure.

A further embodiment of the coupling sleeve in accordance with the present invention provides that the pressure sleeve is guided in the sleeve inner body by a guide surface. The guide surface is in particular a rotation symmetrical inner surface of the sleeve inner body. The pressure sleeve can be moved along the guide surface between its closing position and its opening position. Here, a seal, which ensures a sealing in the closed state of the pressure sleeve, is arranged between the valve tappet and the pressure sleeve, in particular between the pressure sleeve and the valve tappet head. The seal preferably abuts at least in part against an inner circumference of the pressure sleeve. The area size of the surfaces from which a force on the pressure sleeve results, at least indirectly, in the direction of the closing position with a pressure p of the pressure medium present within the flow channel, is defined as an annular surface, namely calculated from the difference of the circular surface within the inner diameter of the guide surface of the sleeve inner body and the circular surface, within the inner diameter of the pressure sleeve in the area of the seal at the valve tappet. The sealing diameter at the inner circumference of the sleeve inner body and the sealing diameter at the valve tappet head are thus taken into account.

When the relevant surface is determined in this way, the surfaces that cause a force in the opposite direction are, on the one hand, not taken into account; on the other hand, the surface of the annular gap between the sleeve inner body and the pressure sleeve is accounted for, the gap in which, via the seal arranged there, a force acts, indirectly, on the pressure sleeve in the direction of the closing position.

In order to exert an influence on the coupling force of the coupling sleeve, it has been shown to be surprisingly advantageous, according to another embodiment, to provide that the annular surface has a size between 160 mm$^2$ and 350 mm$^2$, especially a surface of between 210 mm$^2$ and 300 mm$^2$. With such selection of the size of the annular surface, it can be ensured in a simple manner that the first threshold value for the coupling force is reliably exceeded, and that the second threshold value for the coupling force is reliably not reached at a predetermined pressure.

It has been shown to be advantageous for the flow properties of the coupling sleeve according to another embodiment if it is provided that the pressure sleeve abuts at least indirectly against the valve tappet in its closed state, so that a force is transferred from the pressure sleeve on the valve tappet parallel to the coupling axis. A conical seal is advantageously configured for this purpose between the pressure sleeve and the valve tappet, in particular the valve tappet head, in that the pressure sleeve abuts against a conically running surface of the valve tappet. A conically running counter-sealing surface, which at least partially abuts against the conically running surface in closed state, is likewise advantageously provided on the pressure sleeve. It is thereby provided that the surface and the counter-sealing surface have a coincident or different inclination. With a different inclination, the counter sealing surface abuts only against an edge of the surface at the valve tappet head, whereby an advantageous sealing is achieved.

It is preferably provided according to a further embodiment of the invention of the coupling sleeve that the sealing unit includes a basic sleeve body and a piston. The piston is arranged thereby in such a way that it can be moved relative to the basic sleeve body, in particular also relative to the sleeve inner body. A piston spring, which acts between the piston and the sleeve inner body and exerts a force on the piston in the direction of a sealing position, is furthermore preferably provided. The piston can be moved between a sealing position and an unlocking position, wherein the piston exerts a force on the pressure sleeve with a displacement from the sealing position into the unlocking position along the coupling axis after a specific stroke, so that the force of the piston acts on the pressure sleeve in the direction of the unlocking position of the pressure sleeve.

The sleeve inner body and the basic sleeve body are preferably fixedly connected to the sleeve body. The tappet guide is in particular also attached to the sleeve body via the sleeve inner body and/or the basic sleeve body. The basic sleeve body is preferably screwed to the sleeve body, while at the same time the sleeve inner body and the tappet guide are clamped between the basic sleeve body and the sleeve body, or are floatingly mounted between them. At least one seal is arranged between the basic sleeve body and the sleeve inner body, especially in the area in which the sleeve inner body is clamped by the basic sleeve body against the sleeve body. The piston is part of the flat-sealing face of the coupling sleeve, the second end of the housing, in the decoupled state, so that the piston lies with at least a partial surface in the same plane as the face of the valve tappet. It is ensured in this way that the penetration of dirt via the face of the coupling sleeve is reliably prevented.

The piston is preferably held between the sleeve inner body and the basic sleeve body and can be moved in the longitudinal direction of the coupling sleeve along the coupling axis, parallel to the coupling axis. A displacement of the piston from its sealing position into its locking position always takes place against the force of the piston spring, which pushes the piston into its sealing position, and which is preferably supported on the sleeve inner body. The piston has in particular a circumferential appendage, which interacts with the corresponding ledge on the basic sleeve body and defines the position of the piston in its sealing position.

To establish a connection with the coupling plug, the coupling sleeve includes a plurality of circumferentially arranged locking elements, especially retaining balls, which respectively interact in the decoupled state with a recess in the basic sleeve body and a corresponding circumferential inner groove in the locking sleeve on the housing in such a way that the displaceable sealing unit is fixed in its first position. The locking elements are prevented from leaving the inner circumferential groove of the locking sleeve by use of the piston in its sealing position.

If the piston is forced out of its sealing position, for example as a result of the action of a basic coupling body of a coupling plug, against the force of the piston spring in the direction of its unlocking position, the recess in the basic sleeve body is first unlocked following a predetermined stroke, while a movement of the locking elements is initially still locked by the inserted basic plug body of a coupling plug. With a further stroke of the piston in the direction of its unlocking position, the piston reaches at a projection on the pressure sleeve, with which it interacts, so that henceforth, the movements of the piston in the direction of its unlocking position and the movement of the pressure sleeve in the direction of its unlocking position take place simultaneously in that the piston carries the pressure sleeve with it.

With a further insertion of the coupling plug, the outer groove of the basic plug body of the coupling plug arrives at a position that coincides with that of the locking elements, so that the locking elements can move from the inner circumferential groove of the locking sleeve through the recess in the basic sleeve body into the outer circumferential groove of the basic plug body, whereby a movement of the sealing unit in the direction of the housing interior, into its second position, is made possible, and thus the form-fit connection between the coupling plug and the coupling sleeve with simultaneous opening of the flow channel is realized. If the pressure sleeve is in its opening position, the piston is in its unlocking position.

A sleeve spring, which is clamped in the decoupled state of the coupling sleeve and pushes the sealing unit in the direction of the interior of the housing, in the second position, is advantageously arranged between the locking sleeve and the basic sleeve body. The movement of the sealing unit is at the same time locked by the locking elements in the inner circumferential groove of the locking sleeve and only then unlocked when the locking elements can move into the outer circumferential groove of a coupling plug and thus unlock the movement into the sealing unit.

Regarding the force distribution within the coupling sleeve, it has also been determined that it is advantageous according to another embodiment to provide that the pressure spring that interacts with the pressure sleeve is supported on the tappet guide. The advantage consists here also in that the force of the pressure spring is introduced into the sleeve body via the tappet guide. The fundamental forces with respect to the pressure sleeve are absorbed by the sleeve inner body, which in turn transmits these to the sleeve body.

The actuation of the coupling sleeve can advantageously be further simplified according to another embodiment in that it is provided that a seal is arranged between the pressure sleeve and the valve tappet, and that the material of the seal is polytetrafluoroethylene (PTFE) or polyurethane (PU) or fluorine rubber (FKM). The friction between the pressure sleeve and the valve tappet is reduced by the selection of the material, whereby the sealing function is reliably ensured at the same time. Other potential materials for the seal are nitrile butadiene rubber (NBR) or hydrated nitrile butadiene rubber (HNBR).

The operability of the coupling sleeve is improved according to another embodiment in that a compensating chamber is provided between the sealing unit and the housing; the compensating chamber is connected to the flow channel, and a sleeve spring is arranged in the compensating chamber. The same pressure as in the flow channel is always present in the compensating chamber because the compensating chamber is connected to the flow channel. The forces acting on the sealing unit, which result from the pressure within the flow channel, are at least partially compensated by use of the pressurized surfaces in the compensating chamber, so that a coupling plug is easier to couple in the coupling sleeve. The sleeve spring acts on the sealing unit, especially the basic sleeve body of the sealing unit, in such a way that the sleeve spring exerts a force on the sealing unit in the direction of its second position. The sleeve spring thus reduces the coupling force, so that the force or the properties of the sleeve spring must be considered when selecting the surfaces of the pressure sleeve.

The loss of pressure medium during coupling and decoupling can be advantageously further reduced according to another embodiment in that a wiper seal is provided on the housing, and that the wiper seal abuts at least in part against the piston. The wiper seal is preferably mounted in such a way on the locking sleeve of the housing that the free sealing area extends on the face side on the free surface of the coupling sleeve over the face side of the basic sleeve body. It is further provided that the wiper seal abuts at least partially against the piston, so that the wiper seal likewise abuts against the basic plug body with the insertion of a coupling plug or the basic plug body, which namely displaces the piston from its sealing position into the unlocking position during the coupling procedure.

The coupling force of the coupling sleeve can be estimated as follows, so that the surfaces, in particular the pressure sleeve, can be constructively selected. The following correlation applies for the coupling force $F_K(p)$ of the coupling sleeve, which is dependent on the pressure:

$$F_K(p)=F_F+F_p(p)+F_R(p)$$

$F_F$ represents thereby the sum of the acting spring forces, $F_p(p)$ represents the pressure-dependent forces on the pressure sleeve in the direction of the closing position, and $F_R(p)$ represents the pressure-dependent frictional forces in the coupling sleeve. The following further applies:

$$F_F=F_{KF}+F_D$$

$F_{KF}$ represents the force of the piston spring and $F_D$ represents the force of the pressure spring. The following also applies:

$$F_p(p)=A_{DH}*p$$

$A_{DH}$ represents the area sum of the relevant surfaces, in particular those of the pressure sleeve and of the seal arranged on the pressure sleeve from which a force on the pressure sleeve results in the direction of the closing position, at least in the closing position of the pressure sleeve with a pressure p present in the flow channel. This is, for example, the annular surface that is calculated using the sealing diameter. The following applies, if a sleeve spring is also present:

$$F_F=F_{KF}+F_D-F_H$$

$F_H$ represents the force of the sleeve spring, which acts against the other spring forces.

The initially mentioned object is furthermore attained with a coupling sleeve described herein, namely in that a first face of the pressure sleeve facing in the direction of the opening position is greater than a second face of the pressure sleeve facing in the direction of the closing position. This refers to the respective face of the pressure sleeve, calculated taking into account the respective outer diameter. Taking into account the pressures that are customary for hydraulic couplings and the applicable minimum wall thickness, a sufficient force resulting from the pressure p applied in the flow channel is achieved in that the first face of the pressure sleeve is larger than the second face of the pressure sleeve.

The wall thickness of the pressure sleeve at the first face is preferably greater than the wall thickness at the second face. In particular, if the wall thickness is greatest at the first face, it decreases, in particular, gradually, in the direction of the second face.

It has been proven particularly advantageous according to a first embodiment if it is provided that the surface area ratio of the size of the second face to the size of the first face is between 0.4 and 0.7, in particular between 0.54 and 0.67. The corresponding diameter ratios of the outer diameter are derived from this, that is, the outer diameter at the second face to the outer diameter at the first face, which is preferably within the range of 0.7 and 0.85, especially 0.74 and 0.82. The surface area ratio with a coupling sleeve having a nominal width 19 is between 0.62 and 0.72, especially 0.67. With a coupling sleeve with a nominal width 16, it is furthermore between 0.55 and 0.65, especially 0.6. With a coupling sleeve having a nominal width 12.5, it is furthermore between 0.49 and 0.61, especially 0.54.

With such surface area ratios, it can be reliably ensured that a pressure applied in the flow channel leads to a sufficiently large coupling force with an upper pressure value and leads to a minimal coupling force with a lower pressure value.

The initially mentioned object is furthermore attained by use of a coupling sleeve pursuant to claim 20, wherein it is provided that an annular chamber is available between the sealing unit and the housing in the uncoupled state of the coupling sleeve, the sealing unit is displaced into the annular chamber in the coupled state of the coupling sleeve, the housing has at least one opening, and a decoupling unit is connected to the opening, and the decoupling unit is arranged and configured in such a way that the annular chamber can be pressurized with a medium that is under pressure.

The annular chamber is designed in such a way that it forms surfaces from which, with a pressurization, results a force on the sealing unit that faces in the direction of the first position of the sealing unit.

In the coupled state of a coupling plug, the sealing unit of the coupling sleeve can be displaced in such a way within the housing that the annular chamber is completely or almost completely filled by the sealing unit, in particular the sleeve body of the sealing unit, second position of the sealing unit. To decouple the coupling plug, the sealing unit must be moved in particular against the force of the sleeve spring. This is usually achieved by use of the force of a user.

It is now provided according to the invention that the annular chamber can be pressurized with a medium that is under pressure via the decoupling unit so that the sealing unit is pushed into its first position with a pressurization of the annular chamber with a medium that is under pressure, so that the coupling plug is likewise pushed out of its engagement with the coupling sleeve. A force for decoupling the hydraulic coupling or the coupling sleeve must thus no longer be applied by the user, whereby ease of use is heightened. Pressurized air particularly is intended as medium under pressure, since pressurized air is in any event usually available in agricultural and forestry machinery as well as construction machines.

It has proven particularly advantageous if it is provided that the decoupling unit includes at least one valve. For example, the inflow and outflow of the pressurized medium in the annular chamber can be controlled via the valve.

It has furthermore proven advantageous if it is provided that the decoupling unit is arranged and configured such that the duration of the pressurization of the annular chamber with a medium that is under pressure can be controlled with the decoupling unit, and/or the amount of the medium that is under pressure in the annular chamber can be controlled with the decoupling unit, and/or the pressure of the medium can be controlled with the decoupling unit.

The decoupling unit is arranged and configured in such a way that the annular chamber is pressurized, for example, for a predetermined period of time with medium that is under pressure, so that it is ensured that the form-fit coupling between the coupling plug and the coupling sleeve is unlocked by pushing the sealing unit into its starting position. It is furthermore also provided that the decoupling unit is arranged and configured in such a way that the annular chamber is pressurized with a specific volume of pressurized air, wherein the volume is selected in such a way that the coupling plug is reliably forced out of the coupling sleeve.

There are now, in particular instances, a plurality of possibilities for configuring and further developing the coupling sleeves described herein.

BRIEF DESCRIPTION OF THE DRAWINGS

The drawing shows:

FIG. 7b shows the cutout Z according to FIG. 7a.

DETAILED DESCRIPTION

Figure 1A:
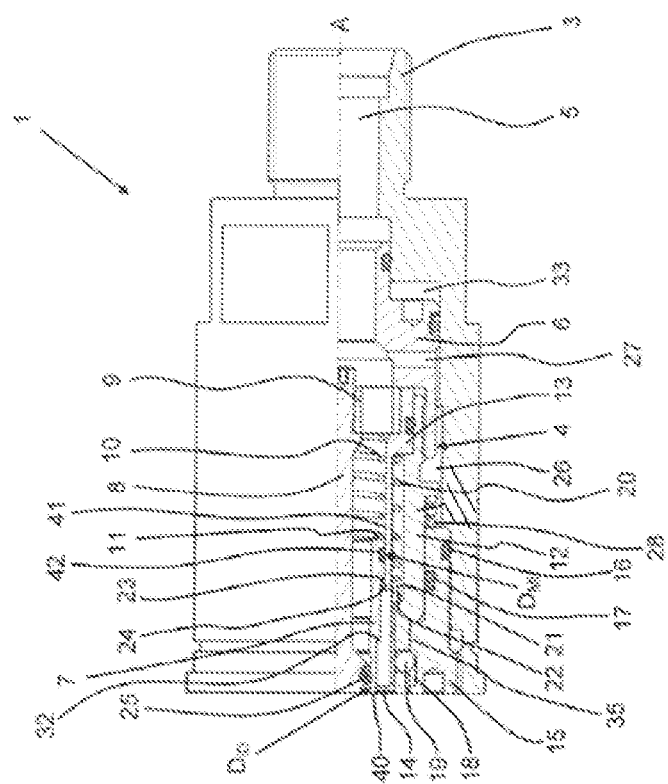
FIGS. 1a and 1b are partial lateral sectional views of an exemplary embodiment of a coupling sleeve and a coupling plug.

FIGS. 1a to 4 show an exemplary embodiment of a coupling sleeve 1 for a hydraulic coupling for producing a form-fit coupling to a coupling plug 2. FIGS. 5a, 5b, 6 and 7 likewise show an exemplary embodiment of a coupling 2. The coupling sleeve 1 includes a housing 3 with a sealing unit 4. The housing 3 delimits a flow channel 5 for the pressure medium, wherein the housing 3 extends rotationally symmetrically around a coupling axis A. The sealing unit 4 includes a sleeve body 6, a pressure sleeve 7, and a valve tappet 8.

The valve tappet 8 is mounted in such a way via a tappet guide 9 on the sleeve body 6 that the valve tappet 8 is centered within the flow channel 5 and the flow channel 5 encloses the valve tappet 8. The tappet guide 9 has a plurality of recesses, through which pressure medium flows, and which are thus part of the flow channel 5. The pressure sleeve 7 is arranged in such a way that it surrounds the valve tappet 8.

Figure 1B:
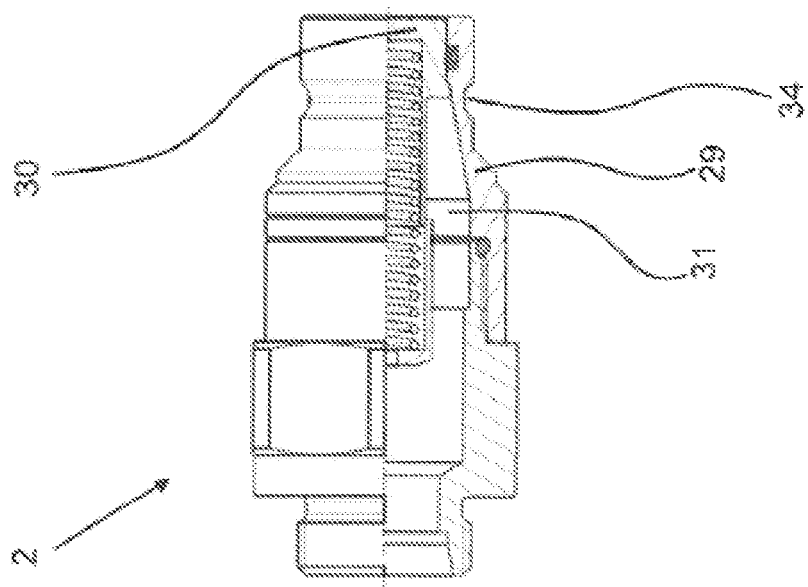

According to FIGS. 1a and 1b, the pressure sleeve 7 is represented in its closing position, in which the flow channel 5 is fully sealed off by the pressure sleeve 7. The pressure sleeve 7 is pressed in the direction of its closing position by use of the pressure spring 10, wherein the pressure spring 10 is supported on the tappet guide 9 in this exemplary embodiment. The surface from which a force on the pressure sleeve 7 results in the direction of the closing position with a pressure p present in the flow channel 5 in the closing position of the pressure sleeve 7, can be calculated at least in the closing position of the pressure sleeve 7 in this exemplary embodiment as an annular surface area based on the difference of the circular surface within the inner diameter $D_{MI}$ of the sleeve inner body 13 in the area of the seal 42 or the guide surface 41 and the circular surface within the inner diameter $D_{ID}$ of the pressure sleeve 7 in the area of the seal 25. This annular surface, which is calculated based on the sealing diameters $D_{MI}$ and $D_{ID}$, is the surface, the relevant surface, from which a pressure-induced force acts on the pressure sleeve 7 in the direction of the closing position. The first face 11 is greater in surface area than the second face 40 in this exemplary embodiment.

The surface calculated in this way, namely the annular surface area based on the difference of the circular surfaces within the diameters $D_{MI}$ and $D_{ID}$, is dimensioned in such a way in this exemplary embodiment that the force in the direction of the closing position of the pressure sleeve 7 resulting from a pressure p applied in the flow channel 5 increases the coupling force of the coupling sleeve, so that the coupling force exceeds a first threshold value at an upper pressure value of the pressure p. A manual coupling of a coupling plug 2 is reliably prevented thereby and the safety for a user is increased. The surface, here the calculable annular surface, is furthermore dimensioned in such a way that the coupling force falls below a predetermined threshold value starting at a lower pressure value of the pressure p.

The sealing unit 4 furthermore includes a basic sleeve body 12, the sleeve inner body 13, and a piston 14, which are mounted on a sleeve body 6. The basic sleeve body 12 and the sleeve inner body 13 are connected to each other and are mounted on the sleeve body 6 in such a way that the tappet guide 9 together with the valve tappet 8 are held within the flow channel 5. To this end, the basic sleeve body 12 is screwed together with the sleeve body 6. The sealing unit 4 is movably mounted in the housing 3 in this exemplary embodiment, wherein the sealing unit 4 is in its first position according to FIGS. 1a to 3. The sealing unit 4 is arranged between the housing 3 and a locking sleeve 15, which terminates the open second housing end of the housing 3.

The locking sleeve 15 is screwed to the housing 3 via a thread and thus holds the sealing unit 4 within the housing 3. A seal 16 is arranged between the locking sleeve 15 and the housing 3. A seal 17 is also arranged between the locking sleeve 15 and the basic sleeve body 12. The locking sleeve 15 has an inner circumference 18, which accommodates at least in part the retaining balls 19, which are circumferentially held in recesses of the basic sleeve body 12 in the represented first position of the sealing unit 4. The piston 14 fixes the retaining balls 19 in the first position of the sealing unit 4 within the inner circumferential groove 18 of the locking sleeve 15, so that the sealing unit 4 is positively fixed by use of the retaining balls 19.

Between the basic sleeve body 12 and the sleeve inner body 13 is arranged an annular chamber, in which is arranged a piston spring 20 that pushes the piston 14 into its sealing position, shown in FIGS. 1a and 1b, so that the piston 14 rests at least in part with the face of the valve tappet 8, especially the valve tappet head, within a plane, namely within the plane of the flat-sealing face of the coupling sleeve 1. The piston 14 has a first ledge 21, which interacts with a second ledge 22 of the basic sleeve body 12 in such a way that the ledges 21, 22 fix the sealing position of the piston 14, wherein the piston spring 20 brings the ledges 21, 22 in contact with each other.

The pressure sleeve 7 has a first projection 23 and the sleeve inner body 13 has a second projection 24, which likewise interact in such a way with each other that the projections 23, 24 fix the closing position of the pressure sleeve 7. The pressure spring 10 causes the projection 23 to be pressed against the projection 24. The projections 23, 24 have the advantage that the pressure sleeve 7 is supported exclusively on the sleeve inner body 13 and no axial force transmission takes place from the pressure sleeve 7 to the valve tappet 8.

In the closing position depicted in FIGS. 1a and 1b, the pressure sleeve 7 encloses the valve tappet 8 in its end area, the valve tappet head, which is expanded relative to its shaft, whereby the flow channel 5 is closed by use of the pressure sleeve 7. A sealing takes place via a seal 25 arranged circumferentially in the valve tappet 8, which in this exemplary embodiment is made from polytetrafluoroethylene (PTFE).

Between the sealing unit 4 and the housing 3, especially between the basic sleeve body 12 and the sleeve body 6 and the housing 3, is provided a compensating chamber 26, which is connected to the flow channel 5 via at least one bore 27, so that the pressure p present in the compensating chamber 26 prevails in the compensating chamber 26. The compensating chamber 26 serves to compensate the forces resulting from the applied pressure p on the sealing unit 4, especially on the sleeve body 6, whereby the operability of the coupling sleeve 1 is simplified.

A sleeve spring 28, which pushes the sealing unit 4 into its second position, is arranged in the compensating chamber 26, between the locking sleeve 15 and the sealing unit 4, in particular between the locking sleeve 15 and the basic sleeve body 12. In the state depicted in FIGS. 1a to 3, in the first position, the sealing unit 4 is however held in its first position by use of the retaining balls 19, which interact with the inner circumferential groove 18 of the locking sleeve 15.

Figure 2:
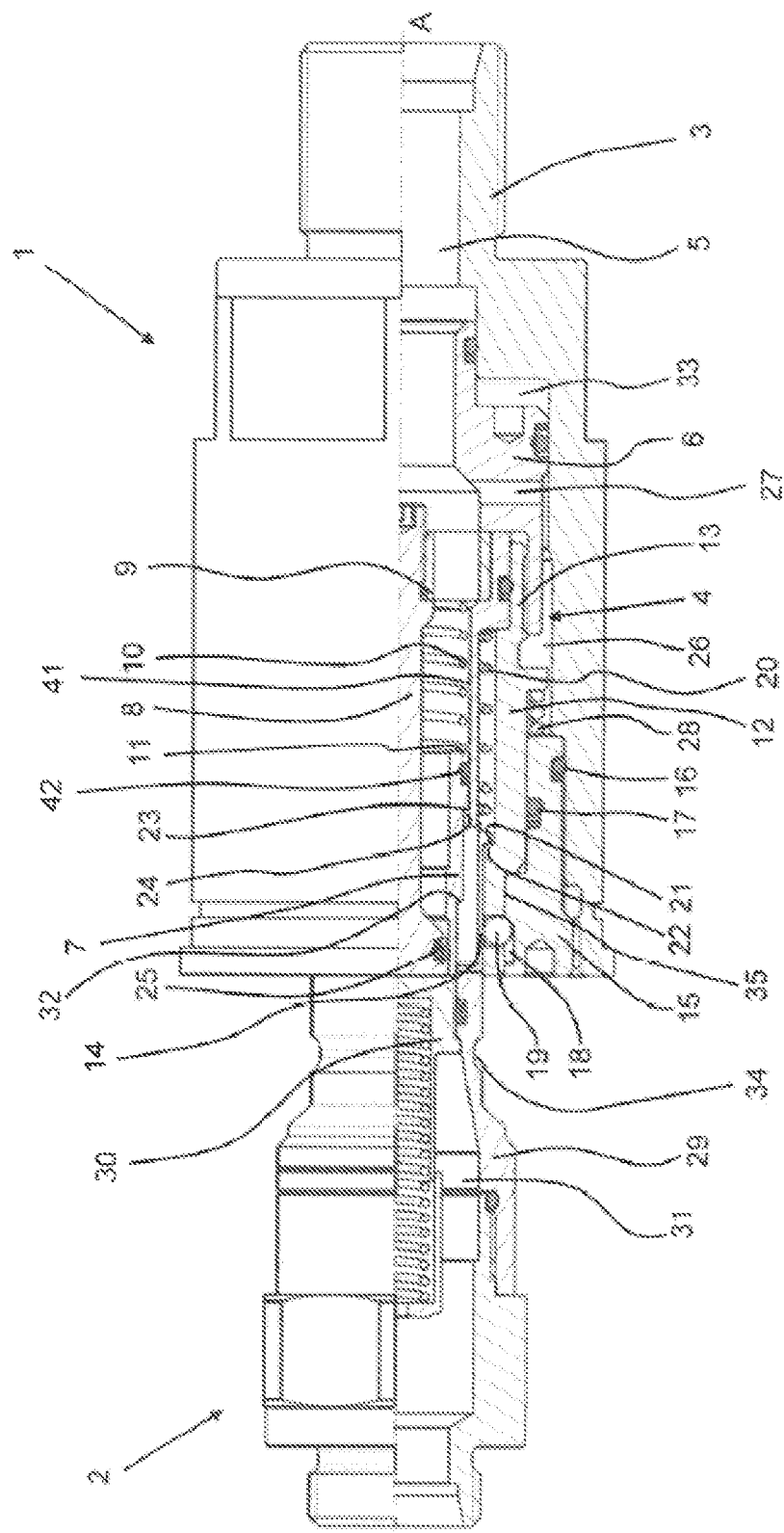
FIG. 2 shows the exemplary embodiment according to FIGS. 1a and 1b with the coupling plug partially inserted into the coupling sleeve.

FIG. 2 shows the exemplary embodiment according to FIGS. 1a and 1b in the state in which the coupling plug 2 is positioned on the flat-sealing face of the coupling sleeve 1 for the purpose of producing a form-fit coupling between the coupling plug 2 and the coupling sleeve 1. The basic plug body 29 exerts at the same time initially a force on the piston 14, which is moved in the direction of the coupling axis A against the force of the piston spring 20 in the direction of its unlocking position. The valve tappet 8 of the coupling sleeve 1 exerts thereby a force on the spring-loaded tappet 30 of the coupling plug 2.

Figure 3:
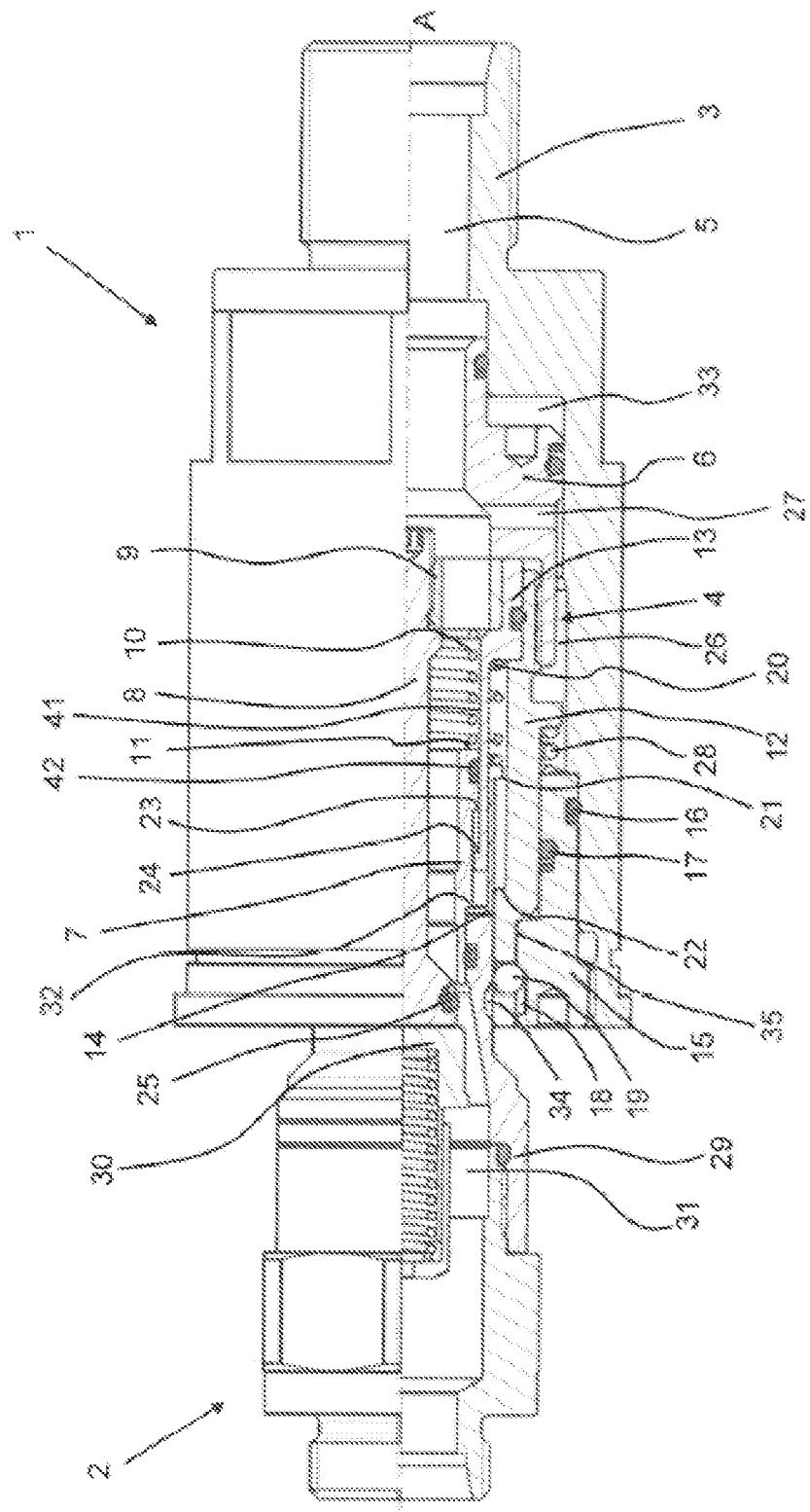
FIG. 3 shows the exemplary embodiment according to FIGS. 1a, 1b and 2 with the coupling plug inserted farther into the coupling sleeve.

As can be seen especially in FIG. 3, the force guides the initially fixed valve tappet 8 of the coupling sleeve 1 so that the tappet 30 of the coupling plug 2 is moved in such a way that the flow channel 31 of the coupling plug 2 is at least partially opened. In the position of the pressure sleeve 7 depicted in FIG. 3, the flow channel 5 is partially open. The piston 14 has been pushed further into the housing 3, parallel to the coupling axis by use of the force applied on the piston 14 in the direction of the coupling axis A via the basic plug body 29, so that the piston 12 rests in such a way on a contact surface 32 on the pressure sleeve 7 that the pressure sleeve 7 is pushed farther by the piston 14 in the direction of its unlocked position, which in turn takes place against the force of the pressure spring 10.

As can further be seen in FIG. 3, an annular chamber 33, into which the sealing unit 4, especially the sleeve body 6, can be displaced, is present between the housing 3 and the sealing unit 4, especially between the sleeve body 6 and the housing 3. A movement of the sealing unit 4 is however still locked by use of the retaining balls 19 in the state according to FIG. 3, but these are rather no longer held in their position by the piston 14 but by the basic plug body 29.

Figure 4:
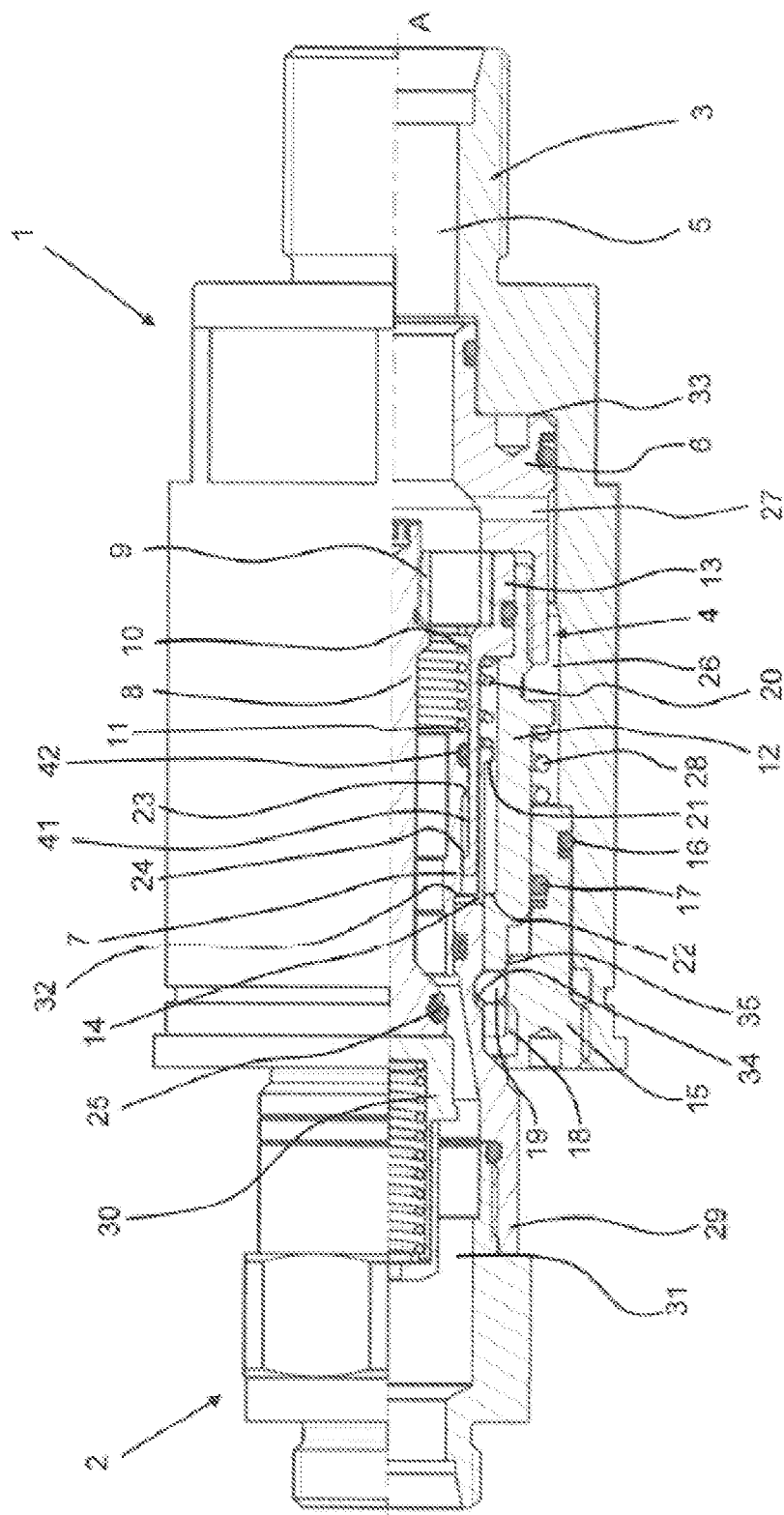
FIG. 4 shows the exemplary embodiment according to FIGS. 1a to 3 in the coupled state of the coupling sleeve.

In FIG. 4 can be seen the fully coupled state of the coupling plug 2 in the coupling sleeve 1. The sealing unit 4 could be displaced in the direction of its second position since the retaining balls 19 had moved into the outer circumferential groove 34 of the coupling plug 2, so that the volume of the annular chamber 33 has now been reduced by the sleeve body 6. The sealing unit 4 is pushed by the sleeve spring 28 present in the compensating chamber 13 in the direction of the second position and is thus held in the second position at the very moment that its movement out of the first position in the direction of the second position is unlocked by the retaining balls 19. The retaining balls 19 have then moved out of the inner circumferential groove 18 of the locking sleeve 15 and are now held by use of a locking surface 35 of the locking sleeve 15 in the outer circumferential groove 34 of the coupling plug 2.

In the fully locked position shown in FIG. 4, the basic plug body 29 has penetrated so far into the sealing unit 4 or the coupling sleeve 1 that the pressure sleeve 7 is in its unlocking position. The flow channel 5 is fully opened in this state and is fluidically connected to the flow channel 31 of the coupling plug 2.

A relative force, which overcomes the force of the sleeve spring 28 and the frictional forces, especially of the seals and the retaining balls 19, as well as the clamping forces transmitted by the retaining balls 19 between the basic plug body 29 and the locking sleeve 15, must be applied between the coupling plug 2 and the coupling sleeve 1 to again separate the coupling plug 2 from the coupling sleeve 1, so that the sealing unit 4 moves again into its first position, in which the retaining balls 19 can again move into the inner circumferential groove 18 of the locking sleeve 15 and the coupling plug 2 is unlocked.

At the same time, both the spring-loaded pressure sleeve 7 and the spring-loaded piston 14 follow the rearward movement of the coupling plug 2, so that initially the flow channel 5 of the coupling sleeve 1 is closed by use of the pressure sleeve 7, whereby subsequently the flow channel 31 of the coupling plug 2 is closed by use of the tappet 30 after the valve tappet 8 of the coupling sleeve 1 no longer exerts a force on the tappet 30.

Figure 5A:
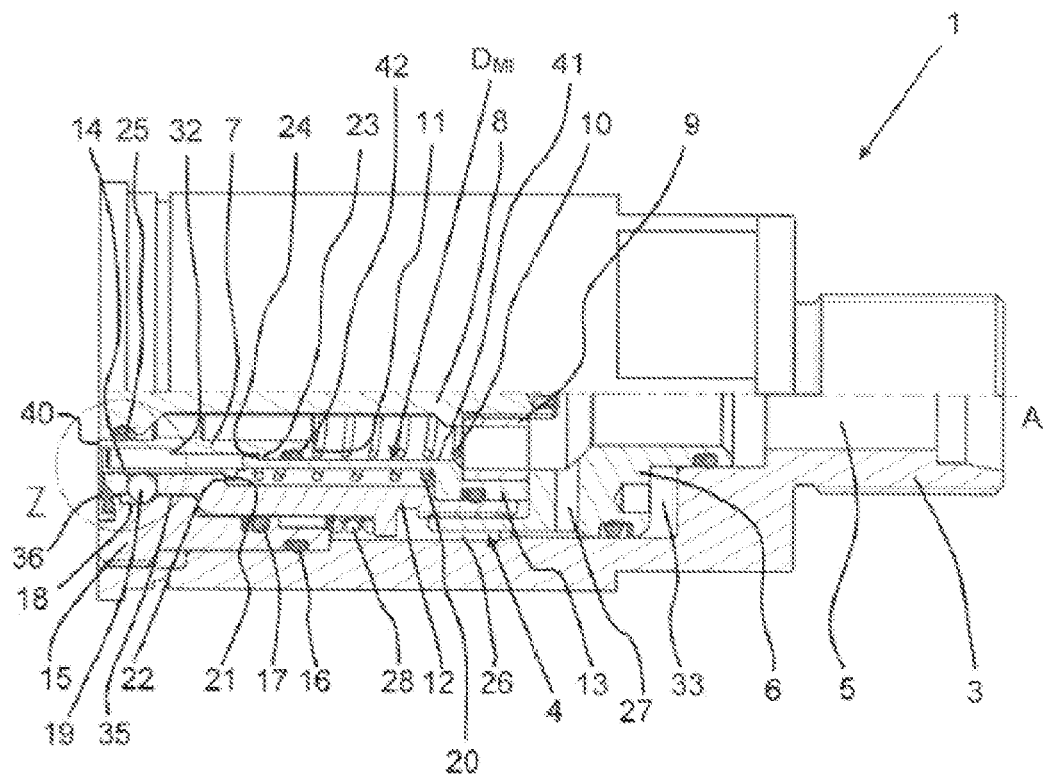
FIG. 5a shows a partial lateral sectional view of another exemplary embodiment of a coupling sleeve.

FIG. 5*a* shows an exemplary embodiment of a coupling sleeve 1, which is essentially configured according to the exemplary embodiments of FIGS. 1*a* to 4 but with the difference that a wiper seal 36 is arranged on the locking sleeve 15. The mode of operation of the exemplary embodiments is consistent; the components are identified with identical reference characters. The first face 11 is also greater in area than the second face 40 in this exemplary embodiment. The area Z of FIG. 5*a* is represented enlarged in FIG. 5*b*.

The wiper seal 36 is mounted in such a way on the locking sleeve 15 that its face side extends over the face of the basic sleeve body 12 and forms a part of the flat-sealing face of the coupling sleeve 1. The wiper seal 36 is held on the locking sleeve 15 with a clamping element 37. The wiper seal 36 abuts on the piston 14 with its free sealing surface, so that the wiper seal 36 also abuts against the basic plug body 29 of a coupling plug 2 if the latter is inserted into the coupling sleeve 1.

Figure 5B:
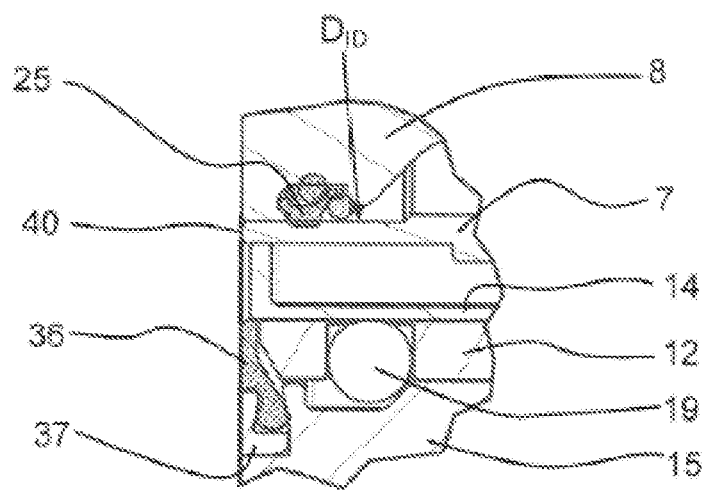
FIG. 5b shows the cutout Z according to FIG. 5a, FIG. 6 shows a partial lateral sectional view of another exemplary embodiment of a coupling sleeve.

In the enlargement according to FIG. 5*b* can be seen the exact configuration of the seal 25 between the pressure sleeve 7 and the valve tappet 8, which is made from fluorine rubber (FKM) in this exemplary embodiment.

Figure 6:
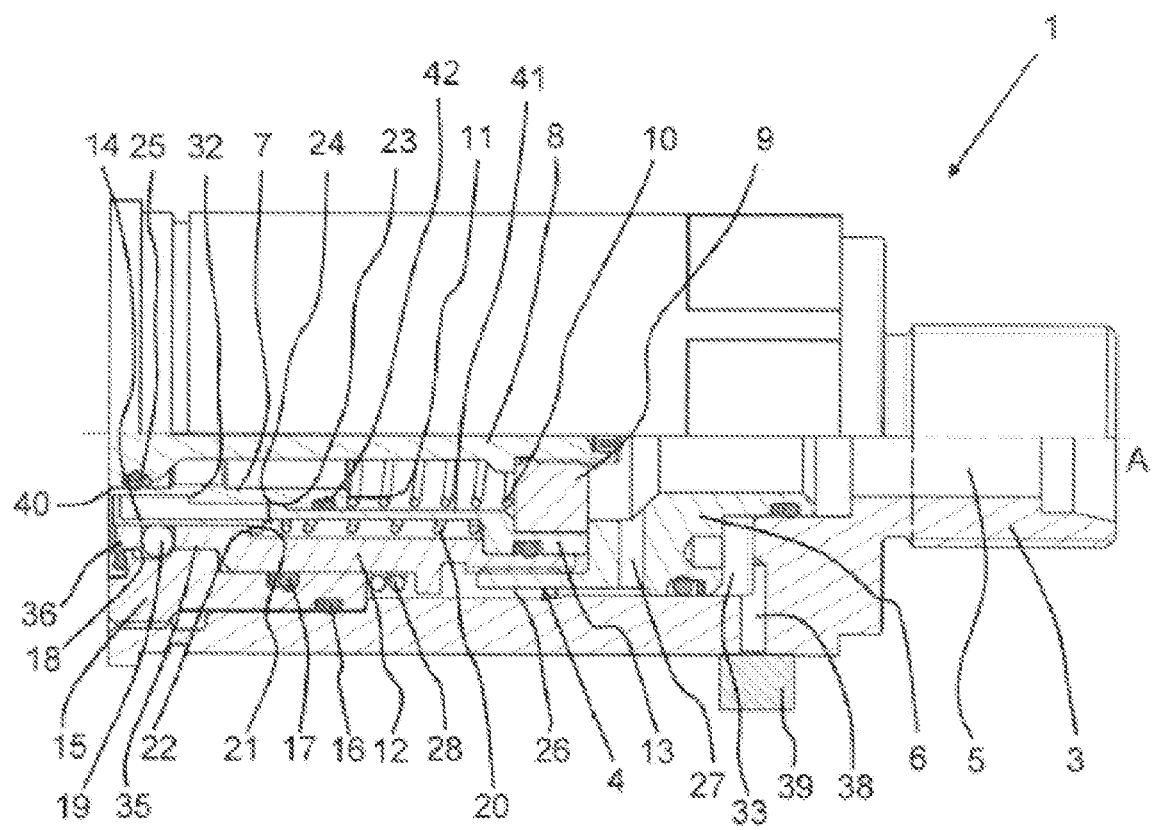

FIG. 6 shows an exemplary embodiment of a coupling sleeve 2, which is configured identically to the exemplary embodiment according to FIG. 5*a*, with the exception that the annular chamber 33 has an opening 38, and a decoupling unit 39 is arranged on the opening 38, so that the annular chamber 33 can be pressurized with a medium that is under pressure for the purpose of decoupling. The decoupling unit 39 includes at least one valve, with which the inflow and outflow of the medium that is under pressure in the annular chamber 33 can be controlled.

The annular chamber 33 is preferably pressurized via the decoupling unit 39 using a pressurized medium, so that the sealing unit 4, which is in its second position in the coupled state of a coupling plug 2, see for example, FIG. 4, is pushed by the pressurized medium in the direction of its first position, that is against the force of the sleeve spring 28 and the frictional forces, especially of the seals and retaining balls 19, as well as the clamping forces between the basic plug body 29 and the locking sleeve 15 via the retaining balls 19, in that the pressurized medium produces a force on the sealing unit 4, especially the sleeve body 6, via the surfaces of the annular chamber 33 that are relevant for the effect of the pressure. Due to the resulting movement of the sealing unit 4 in the direction of its first position, the coupling plug 2 is pushed at the same time out of the coupling sleeve 1, so that a decoupling takes place.

Figure 7A:
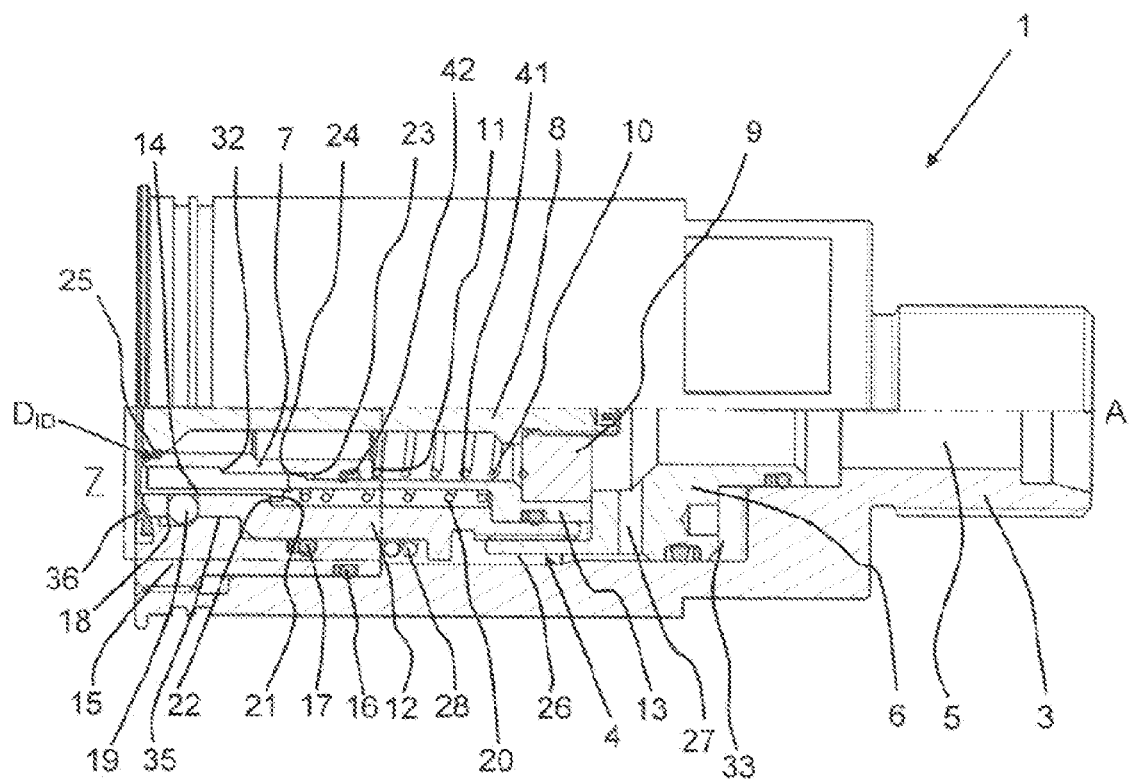
FIG. 7a is a partial lateral sectional view of another exemplary embodiment of a coupling sleeve.
Figure 7B:
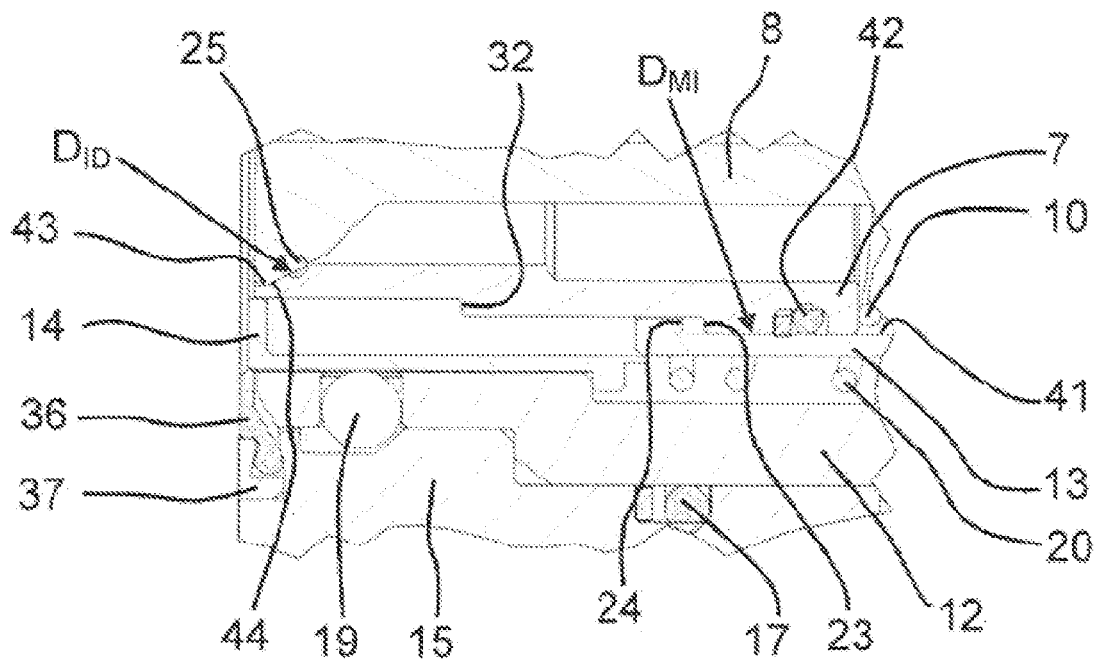

FIG. 7*a* shows a lateral partial sectional view of another exemplary embodiment of a coupling sleeve 1. The mode of operation is similar to the mode of operation of the exemplary embodiment according to FIGS. 1*a* and 1*b*, so that the components are identified with identical reference characters. In this exemplary embodiment, the pressure sleeve 7 and the valve tappet 8, especially the valve tappet head, are however configured in such a way that the pressure sleeve 7 abuts in such a way against the valve tappet head in its closing position that the pressure sleeve 7 exerts a force on the valve tappet head parallel to the coupling axis A. The area Z on the valve tappet head is shown enlarged in FIG. 7*b*.

The valve tappet head has a slanted surface 43, against which the pressure sleeve 7 abuts with a likewise slanted counter sealing surface 44 in its depicted closing position. The inclination of the surface 43 and the counter sealing surface 44 is identical in this exemplary embodiment. A seal 25 is additionally arranged in the surface 43 to enhance the sealing function. The pressure sleeve 7 is configured in such a way, in particular the length of the pressure sleeve 7 is selected in such a way, that the projection 23 in the depicted pressureless closed state of the pressure sleeve 7 is spaced away from the projection 24. A transmission of forces from the pressure sleeve 7 parallel to the coupling axis A takes place only onto the valve tappet 8, especially the valve tappet head. Only as of a specific pressure within the locked flow channel, under the effect of which the valve tappet 8 is extended and the pressure sleeve 7 expands, do the projections 23, 24 come in contact with each other, whereby a force transmission from the pressure sleeve 7 to the sleeve body 13 takes place, and the valve tappet 8 is thus relieved. The projections 23, 24 come in contact advantageously starting at a pressure between 1.5 times and 2 times the operating pressure.

The annular surface, from which a pressure-dependent force acts on the pressure sleeve 7 in the direction of its closing position when a pressure p is present in the flow channel, can be calculated in this exemplary embodiment as the difference of the circular surface within the inner diameter $D_{MI}$ at the guide surface 41 of the sleeve inner body 13 and the circular surface within the inner diameter $D_{ID}$ of the pressure sleeve 7 in the area of the seal 25.

While the above description constitutes the preferred embodiment of the present invention, it will be appreciated that the invention is susceptible to modification, variation and change without departing from the proper scope and fair meaning of the accompanying claims.

The invention claimed is:

1. A coupling sleeve for a hydraulic coupling on a pressure medium line to produce a form-fit coupling to a coupling plug, comprising, a housing and a sealing unit, wherein the housing has a flow channel for a pressure medium and defining a coupling axis, wherein the sealing unit comprises a sleeve body, a pressure sleeve, and a valve tappet, the sealing unit delimits part of the flow channel, the valve tappet is held on the sleeve body via a tappet guide in such a way that the valve tappet is arranged in the flow channel, the pressure sleeve surrounds the valve tappet, the pressure sleeve is displaced along the coupling axis and is held between a closing position, in which the flow channel is closed off by the pressure sleeve, and an opening position, in which the flow channel is opened by the pressure sleeve, the pressure sleeve is loaded by a pressure spring acting in the direction of the closing position, and a coupling force must be applied to produce a positive coupling of the coupling sleeve to the coupling plug, an area of surfaces of the pressure sleeve from which, at least in the closing position of the pressure sleeve with a pressure of the pressure medium present in the flow channel, a force results from the pressure acting on the area in the direction of the closing position of the pressure sleeve is selected such that a predetermined upper pressure value of the pressure a predetermined first threshold value of the coupling force is exceeded in order to prevent producing the positive coupling to the coupling plug, and wherein the coupling force is at least 800 N, when the upper pressure value is 1 MPa.

2. The coupling sleeve according to claim 1, that further comprising, the area of the surfaces, from which the force in the direction of the closing position in the closing position of the pressure sleeve is further selected such that below a predetermined lower pressure value of the pressure the closing force is less than a predetermined second threshold value for the coupling force.

3. The coupling sleeve according to claim 2, further comprising, the coupling force is at most 450 N below the lower pressure value of 0.35 M Pa.

4. The coupling sleeve according to claim 1, wherein the sealing unit further comprises a sleeve inner body, and the pressure sleeve is guided by the sleeve inner body.

5. The coupling sleeve according to claim 4, further comprising, the pressure sleeve has a first projection and the sleeve inner body has a second projection, and a force can be transmitted with the first projection and the second projection from the pressure sleeve to the sleeve inner body.

6. The coupling sleeve according to claim 4, further comprising, the pressure sleeve is guided in the sleeve inner body by a guide surface and a seal is arranged between the valve tappet and the pressure sleeve, and in that the area of the surfaces, from which the force results on the pressure sleeve in the direction of the closing position is calculated as an annular surface area based on a difference of the circular surface within an inner diameter of the guide surface and a circular surface within an inner diameter of the pressure sleeve in the area of the seal.

7. The coupling sleeve according to claim 6, further comprising, the annular surface area has a size of between 160 mm$^2$ and 350 mm$^2$.

8. The coupling sleeve according to claim 1, further comprising, the pressure sleeve abuts at least indirectly on the valve tappet in the closed position, so that a force parallel to the coupling axis is transmitted from the pressure sleeve on the valve tappet.

9. The coupling sleeve according to claim 1, wherein, the sealing unit comprises a basic sleeve body and a piston, the piston is arranged in such a way that the piston can be moved relative to the basic sleeve body, the piston can be moved between a sealing position and an unlocking position, the piston exerts a force on the pressure sleeve with a displacement from the sealing position into the unlocking position along the coupling axis after a specific stroke, and the force of the piston acts on the pressure sleeve in the direction of the unlocking position of the pressure sleeve.

10. The coupling sleeve according to claim 9, further comprising, a wiper seal, and the wiper seal abuts with a sealing area at least in part on the piston.

11. The coupling sleeve according to claim 9, further comprising, a piston spring that pushes the piston into the sealing position and the following correlation exists for the coupling force $F_K$ (p) that is dependent on the pressure:

$$F_K(p)=F_F+F_p(p)+F_R(p)$$

wherein $F_F$ represents the effective spring forces, $F_p$ (p) represents the pressure-dependent forces on the pressure sleeve in the direction of the closing position, p represents the pressure, and $F_R$ (p) represents the pressure-dependent frictional forces in the coupling sleeve, wherein applies:

$$F_F=F_{KF}+F_D$$

wherein $F_{KF}$ represents the force of the piston spring and $F_D$ represents the force of the pressure spring, wherein $$F_p(p)=A_{DH}*p$$

wherein $A_{DH}$ represents the surface from which the force on the pressure sleeve results, at least in the closing position of the pressure sleeve, in the direction of the closing position with the pressure of the pressure medium present in the flow channel.

12. The coupling sleeve according to claim 11, further comprising, the following applies:

$$F_F=F_{KF}+F_D-F_H$$

wherein $F_H$ represents the force of the sleeve spring.

13. The coupling sleeve according to claim 1, further comprising, the pressure spring that interacts with the pressure sleeve is supported on the tappet guide.

14. The coupling sleeve according to claim 1, further comprising, a seal is arranged between the pressure sleeve and the valve tappet, and the material of the seal is a polytetrafluoroethylene or a polyurethane or a fluorine rubber.

15. The coupling sleeve according to claim 1, further comprising, the sealing unit can be displaced within the housing along the coupling axis, an annular chamber is present between the sealing unit and the housing in an uncoupled state of the coupling sleeve, the sealing unit is displaced into the annular chamber in a decoupled state of the coupling sleeve, the housing has at least one opening, and a decoupling unit is connected to the opening, and the decoupling unit is arranged and configured in such a way that the annular chamber can be pressurized with the pressure medium that is under pressure.

16. The coupling sleeve according to claim 15, wherein the decoupling unit comprises at least one valve.

17. The coupling sleeve of claim 15, further comprising, the decoupling unit is arranged and configured in such a way that the duration of the pressurization of the annular chamber with the pressure medium that is under pressure can be controlled with the decoupling unit, or the volume amount of the pressure medium that is under pressure in the annular chamber can be controlled with the decoupling unit, or the pressure of the pressure medium can be controlled with the decoupling unit.

18. A coupling sleeve for a hydraulic coupling on a pressure medium line to produce a form-fit coupling to a coupling plug, comprising, a housing and a sealing unit, wherein the housing has a flow channel for a pressure medium and defining a coupling axis, wherein the sealing unit comprises a sleeve body, a pressure sleeve, and a valve tappet, the sealing unit delimits part of the flow channel, the valve tappet is held on the sleeve body via a tappet guide in such a way that the valve tappet is arranged in the flow channel, the pressure sleeve surrounds the valve tappet, the pressure sleeve is displaced along the coupling axis and is held between a closing position, in which the flow channel is closed off by the pressure sleeve, and an opening position, in which the flow channel is opened by the pressure sleeve, the pressure sleeve is loaded by a pressure spring acting in the direction of the closing position, and a coupling force must be applied to produce a positive coupling of the coupling sleeve to the coupling plug,
- an area of surfaces of the pressure sleeve from which, at least in the closing position of the pressure sleeve with a pressure of the pressure medium present in the flow channel, a force results from the pressure acting on the area in the direction of the closing position of the pressure sleeve is selected such that that a predetermined upper pressure value of the pressure a predetermined first threshold value of the coupling force is exceeded in order to prevent producing the positive coupling to the coupling plug, and
- a compensating chamber is provided between the sealing unit and the housing, the compensating chamber is connected to the flow channel, and a sleeve spring is arranged in the compensating chamber.

19. A coupling sleeve for a hydraulic coupling on a pressure medium line to produce a form-fit coupling to a coupling plug, comprising, a housing and a sealing unit, wherein the housing has a flow channel for a pressure medium and defining a coupling axis, the sealing unit comprises a sleeve body, a pressure sleeve, and a valve tappet, the sealing unit delimits part of the flow channel, the valve tappet is held in such a way on the sleeve body via a tappet guide that the valve tappet is arranged in the flow channel, the pressure sleeve surrounds the valve tappet, the pressure sleeve can be displaced along the coupling axis and is held between a closing position, in which the flow channel is closed off by the pressure sleeve, and an opening position, in which the flow channel is opened by the pressure sleeve, the pressure sleeve is loaded by a pressure spring acting in the direction of the closing position, the pressure sleeve has a first face facing in the direction of the opening position, and a second face facing in the direction of the closing position,
- the first face is greater in area than the second face wherein a surface ratio of an area of the second face to an area of the first face is between 0.4 and 0.7.

20. A coupling sleeve for a hydraulic coupling to a pressure medium line to produce a form-fit coupling to a coupling plug, having a housing and a sealing unit, wherein the housing has a flow channel for a pressure medium and defines a coupling axis, the sealing unit comprises a sleeve body, a pressure sleeve, and a valve tappet, the sealing unit delimits part of the flow channel, the valve tappet is held in such a way on the sleeve body via a tappet guide that the valve tappet is arranged in the flow channel, the pressure sleeve surrounds the valve tappet, the pressure sleeve can be displaced along the coupling axis and is held between a closing position, in which the flow channel is closed off by the pressure sleeve, and an opening position, in which the flow channel is opened by the pressure sleeve, the pressure sleeve is loaded by a pressure spring acting in the direction of the closing position,
- an annular chamber is present between the sealing unit and the housing in a decoupled state of the coupling sleeve, the sealing unit is displaced into the annular chamber in a coupled state of the coupling sleeve, the housing has at least one opening, and a decoupling unit is connected to the opening, and the decoupling unit is arranged and configured in such a way that the annular chamber can be pressurized with the pressure medium that is under pressure.

* * * * *